United States Patent

Nakamura et al.

(10) Patent No.: US 12,199,488 B2
(45) Date of Patent: Jan. 14, 2025

(54) LINEAR TRANSPORT SYSTEM

(71) Applicant: Mitsubishi Electric Corporation, Tokyo (JP)

(72) Inventors: Yuichiro Nakamura, Tokyo (JP); Takumi Tomatsu, Tokyo (JP); Zaini Ariff, Tokyo (JP); Jun Hosono, Tokyo (JP); Hiroshi Wakayama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/721,203

(22) PCT Filed: Feb. 21, 2022

(86) PCT No.: PCT/JP2022/006845
§ 371 (c)(1),
(2) Date: Jun. 18, 2024

(87) PCT Pub. No.: WO2023/157273
PCT Pub. Date: Aug. 24, 2023

(65) Prior Publication Data
US 2024/0421684 A1 Dec. 19, 2024

(51) Int. Cl.
*H02K 41/03* (2006.01)
*B65G 54/02* (2006.01)

(52) U.S. Cl.
CPC .......... *H02K 41/031* (2013.01); *B65G 54/02* (2013.01)

(58) Field of Classification Search
CPC ...... H02K 41/031; H02K 41/03; H02K 41/02; H02K 2213/03; H02K 1/14; H02K 1/16; H02K 1/27; H02K 1/34; B65G 54/02
(Continued)

(56) References Cited

U.S. PATENT DOCUMENTS 5,642,013 A * 6/1997 Wavre .................. H02K 41/031
310/58
2003/0048011 A1* 3/2003 Kashkarov ............. H02K 41/03
310/12.25
(Continued)

FOREIGN PATENT DOCUMENTS

JP S60-030195 B2 7/1985
JP H06-38500 A 2/1994
(Continued)

OTHER PUBLICATIONS

Machine translation of WO-2017010552-A1. (Year: 2017).*
(Continued)

*Primary Examiner* — Michael Andrews
(74) *Attorney, Agent, or Firm* — XSENSUS LLP

(57) ABSTRACT

A linear transport system includes: a stator module including an iron core that includes a plurality of teeth and a coil wound around the iron core; a movable element that includes a plurality of identical magnets disposed on a side surface parallel to a moving direction, and is propelled by an electromagnetic force from the coil; and a motor drive control device that controls the movable element by supplying an independent current of single-phase AC individually to the coil included in the stator module. When Lm is a magnet pitch that is a pitch of the magnets disposed in the movable element, and Lt is a tooth pitch that is a pitch of the teeth, $1.3 \leq Lm/Lt \leq 1.4$ is satisfied.

7 Claims, 5 Drawing Sheets

(58) Field of Classification Search
USPC .................................................. 310/12.18
See application file for complete search history.

(56) References Cited

U.S. PATENT DOCUMENTS

| | | |
|---|---|---|
| 2008/0111430 A1 | 5/2008 | Jenny |
| 2018/0062535 A1 | 3/2018 | Kaulmann et al. |

FOREIGN PATENT DOCUMENTS

| | | | |
|---|---|---|---|
| JP | H10-511837 A | 11/1998 | |
| JP | 2001-258235 A | 9/2001 | |
| JP | 2003-070225 A | 3/2003 | |
| JP | 2007-089260 A | 4/2007 | |
| JP | 2008-125345 A | 5/2008 | |
| JP | 2012-039680 A | 2/2012 | |
| WO | WO-2017010552 A1 * | 1/2017 | ........... H02K 41/031 |

OTHER PUBLICATIONS

International Search Report and Written Opinion mailed on May 10, 2022, received for International Application No. PCT/JP2022/006845, filed on Feb. 21, 2022, 11 pages including English Translation.

Notice of Reasons for Refusal mailed on Oct. 18, 2022, received for JP Application 2022-543000, 9 pages including English Translation.

Decision to Grant mailed on Mar. 14, 2023, received for JP Application 2022-543000, 5 pages including English Translation.

* cited by examiner

LINEAR TRANSPORT SYSTEM

CROSS-REFERENCE TO RELATED APPLICATION

This application is a national stage application, pursuant to 35 U.S.C. § 371, of International Patent Application No. PCT/JP2022/006845, filed Feb. 21, 2022, the entire contents of which are incorporated herein by reference.

FIELD

The present disclosure relates to a linear transport system for moving a movable element by using thrust of a linear motor.

BACKGROUND

As one of linear transport systems for moving a movable element by using thrust of a linear motor, there is a transport system in which each of a plurality of movable elements to which a magnet is attached independently moves along a linear guide disposed on a stator.

For example, in a linear transport system of Patent Literature 1, a coil wound around a tooth of a stator is energized to generate thrust in a movable element in the use of an attractive force and a repulsive force between a magnet and the coil, and the movable element is moved along a linear guide.

CITATION LIST

Patent Literature

Patent Literature 1: Japanese Patent Application Laid-open No. 2003-70225

SUMMARY OF INVENTION

Problem to be Solved by the Invention

However, the technique of Patent Literature 1 does not disclose a combination of a magnet pitch and a tooth pitch in a linear motor of the linear transport system, and there has been a problem in that cogging thrust increases or thrust density decreases when the combination of the magnet pitch and the tooth pitch is inappropriate.

The present disclosure has been made in view of the above, and an object thereof is to obtain a linear transport system capable of improving thrust density while reducing cogging thrust.

Means to Solve the Problem

To solve the above problems and achieve an object, a linear transport system according to the present disclosure includes: a stator module including an iron core and a coil wound around the iron core, the iron core including a plurality of teeth; a movable element to be propelled by an electromagnetic force from the coil, the movable element including a plurality of magnets that are identical and disposed on a side surface parallel to a moving direction; and a motor drive control device to control the movable element by supplying an independent current of single-phase alternating current individually to the coil included in the stator module, wherein when Lm is a magnet pitch that is a pitch of the magnets disposed in the movable element, and Lt is a tooth pitch that is a pitch of the teeth, $1.3 \leq Lm/Lt \leq 1.4$ is satisfied.

Effects of the Invention

The linear transport system according to the present disclosure has an effect of being able to improve thrust density while reducing cogging thrust.

DESCRIPTION OF EMBODIMENTS

Hereinafter, a linear transport system according to embodiments of the present disclosure will be described in detail with reference to the drawings.

First Embodiment

Figure 1:
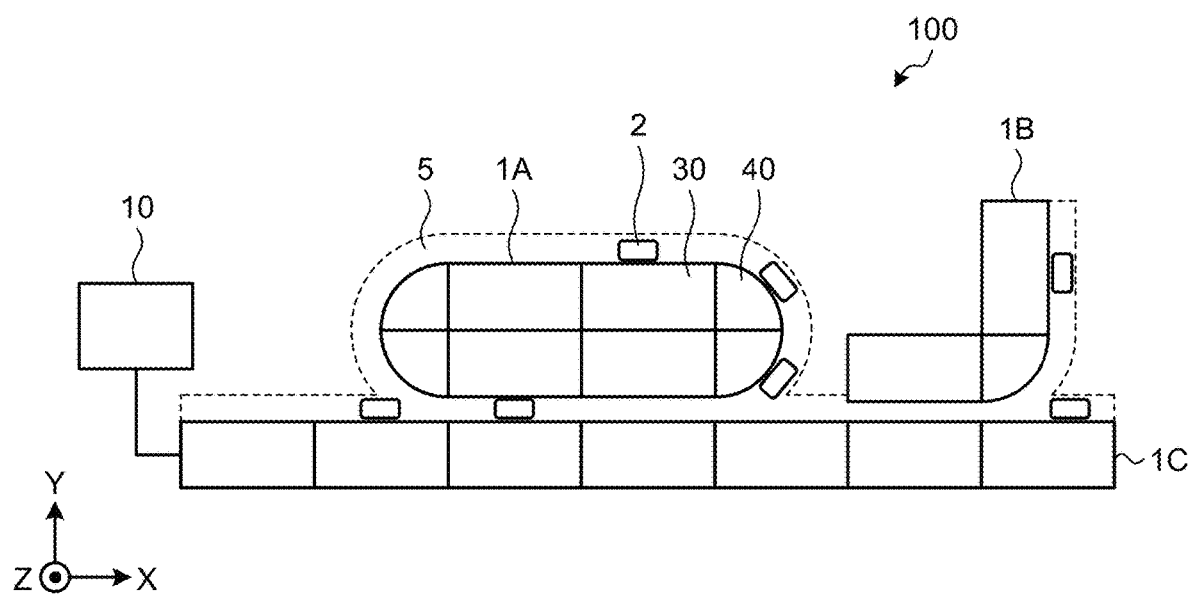
FIG. 1 is a view illustrating a schematic configuration of a linear transport system according to a first embodiment.

FIG. 1 is a view illustrating a schematic configuration of a linear transport system according to a first embodiment. FIG. 1 illustrates an example of a linear transport system 100 in a top view. In the following description, a case will be described in which a horizontal plane is an XY plane, a Z-axis direction is a direction parallel to a vertical direction, and a movable element 2 moves in a direction parallel to the XY plane.

The linear transport system 100 includes one or a plurality of stator modules, one or a plurality of movable elements, a transport path 5, and a motor drive control device 10. FIG. 1 illustrates a case where the linear transport system 100 includes three stator module groups 1A to 1C and seven movable elements 2. Each of the stator module groups 1A to 1C includes a plurality of stator modules. The stator module groups 1A and 1B each include a stator module 30 of a straight portion and a stator module 40 of a curved portion, and the stator module group 1C includes the stator module 30 of a straight portion.

In the linear transport system 100, the stator module 30 or the stator module 40 and the movable element 2 constitute a motor unit (motor units 50 to 54 to be described later) that is a linear motor.

The linear transport system 100 is a system in which a motor unit (the motor unit 50 in the first embodiment) moves the movable element 2 by using thrust to transport a transport target object (a workpiece or the like) placed on a table (not illustrated) on the movable element 2. The motor unit 50 is disposed on a frame (not illustrated) included in an industrial machine or the like.

The stator module groups 1A to 1C include a plurality of coils wound around a plurality of teeth. The transport path 5 is disposed on an outer peripheral portion of each of the stator module groups 1A to 1C. The movable element 2 includes a permanent magnet (a magnet 21 to be described later).

The motor drive control device 10 is connected to the stator module groups 1A to 1C, and is a device that drives the motor unit 50 by applying a current to the stator module groups 1A to 1C. Note that illustration of connection between the motor drive control device 10 and the stator module groups 1A and 1B is omitted.

The motor drive control device 10 independently moves each of the movable elements 2 along linear guides (not illustrated) disposed in the stator module groups 1A to 1C. Specifically, the motor drive control device 10 energizes the coils of the stator module groups 1A to 1C to generate thrust in the movable elements 2 by using an attractive force and a repulsive force between the magnets of the movable elements 2 and the coils, and causes the movable elements 2 to move along the linear guide. Consequently, the movable elements 2 move on the transport path 5.

Figure 2:
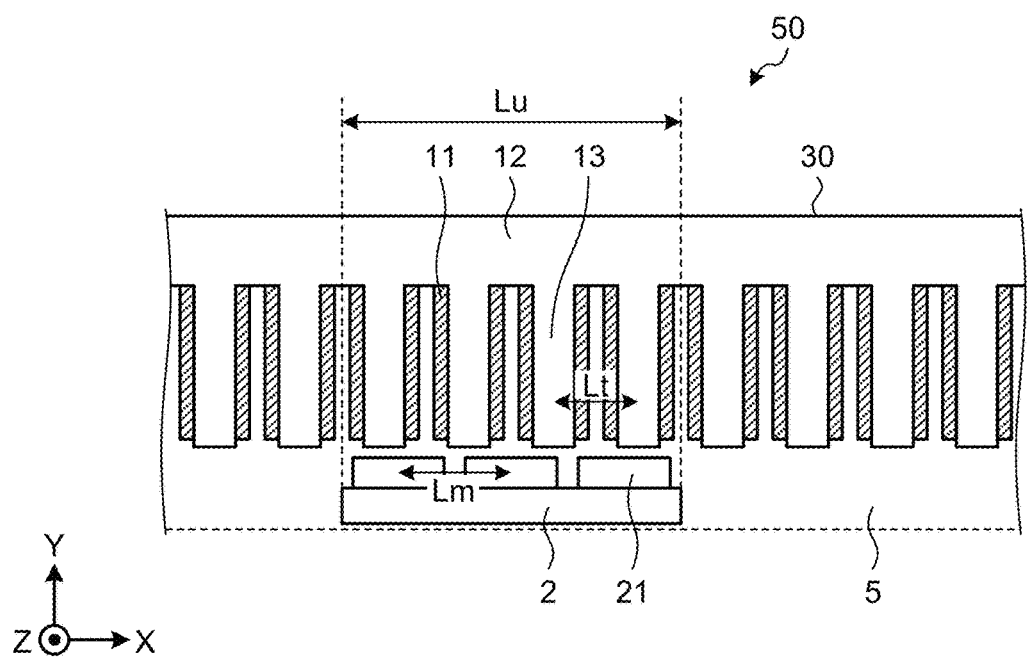
FIG. 2 is a transverse cross-sectional view of a motor unit included in the linear transport system according to the first embodiment.

FIG. 2 is a transverse cross-sectional view of a motor unit included in the linear transport system according to the first embodiment. FIG. 2 illustrates a cross-sectional configuration of a part of the motor unit 50 included in the stator module group 1A when the linear transport system 100 illustrated in FIG. 1 is taken along a plane parallel to the XY plane. The motor unit 50 includes the stator module 30 and the movable element 2.

The stator module 30 includes a plurality of coils 11 and an iron core 12 including a plurality of teeth 13. In the stator module 30, the coil 11 is wound around the tooth 13 of the iron core 12. The iron core 12 of the stator module 30 is a laminated steel sheet such as an electromagnetic steel sheet.

The teeth 13 extend in a direction of a plane (XY plane) including a moving direction of the movable element 2 such that a direction perpendicular to the moving direction of the movable element 2 is an axial direction. FIG. 2 illustrates a case where the teeth 13 extend in a direction parallel to the Y-axis direction. The coil 11 is wound around the tooth 13 with the extending direction of the teeth 13 as an axis. That is, the coil 11 is wound around the tooth 13 so as to be annular in shape when viewed from the extending direction (Y-axis direction) of the teeth 13. The movable element 2 is propelled by an electromagnetic force from the coil 11. In the linear transport system 100, the plurality of movable elements 2 are independently controlled on the transport path 5.

The movable element 2 includes a plurality of magnets 21 disposed on one side surface or a plurality of magnets 21 disposed on both side surfaces. The side surface on which the plurality of magnets 21 are disposed is a side surface parallel to the moving direction of the movable element 2 (the X-axis direction in FIG. 2) among side surfaces of the movable element 2. The plurality of magnets 21 are disposed on the side surface of the movable element 2 along the moving direction of the movable element 2. That is, the moving direction of the movable element 2 is parallel to an arrangement direction of the magnets 21 that are disposed on one side surface.

Note that FIG. 2 illustrates a case where three magnets 21 are disposed on one side surface of the movable element 2, but the number of the magnets 21 disposed on the side surface of the movable element 2 may be two or four or more.

The plurality of magnets 21 included in the movable element 2 are identical magnets. That is, all magnets 21 included in the movable element 2 have the same shape and magnetic characteristics. In other words, the movable element 2 includes the magnets 21 of one type.

In the movable element 2, a component on which the magnet 21 is disposed is made by a soft magnetic material such as iron. The motor drive control device 10 supplies a current to each coil 11 of the stator module groups 1A to 1C in the vicinity of the movable element 2. The current supplied by the motor drive control device 10 is not UVW three-phase AC, but is single-phase AC for independently controlling each phase. That is, the motor drive control device 10 supplies a current with any waveform to each coil 11 by single-phase control. In this way, the motor drive control device 10 controls the movable element 2 by supplying an independent current of single-phase AC to each coil 11.

In the linear transport system 100, when a distance between adjacent magnets 21 is a magnet pitch Lm and a distance between adjacent teeth 13 is a tooth pitch Lt, $1.3 \leq Lm/Lt \leq 1.4$ is satisfied.

The magnet pitch Lm is a distance between a center position of one magnet 21 of the adjacent magnets 21 in the moving direction (the X-axis direction in FIG. 2) and a center position of another magnet 21 in the moving direction. The tooth pitch Lt is a distance between, among teeth 13 adjacent to each other, a center position of one tooth 13 of the teeth 13 in the moving direction of the magnet 21 and a center position of the other tooth 13 in the moving direction of the magnet 21.

Further, a length in which one movable element 2 faces the stator module groups 1A to 1C is defined as a unit length Lu. That is, the unit length Lu is a length in the moving direction (the X-axis direction in FIG. 2) of the movable element 2.

In the linear transport system 100, when the number of pieces of the magnets 21 (hereinafter, referred to as a magnet quantity) included in the unit length Lu is Nm, the number of pieces of the teeth 13 (hereinafter, referred to as a tooth quantity) is Nt, and the greatest common divisor of Nm and Nt is k, Nt/k obtained by dividing the tooth quantity Nt by the greatest common divisor satisfies 3n+1 or 3n+2 when n is a natural number. For example, when Nm=3 and Nt=4, Lm/Lt=4/3 and Nt/k=4 are satisfied, and a phase difference of a current waveform supplied to the adjacent coil 11 is 135°. That is, when the movable element 2 includes three magnets 21, one pole of the magnet 21 corresponds to 180°, and the four teeth 13 are included in the unit length Lu, so that the phase difference between the current waveform supplied to the adjacent coils 11 is 180°×3/4=135°.

Figure 3:
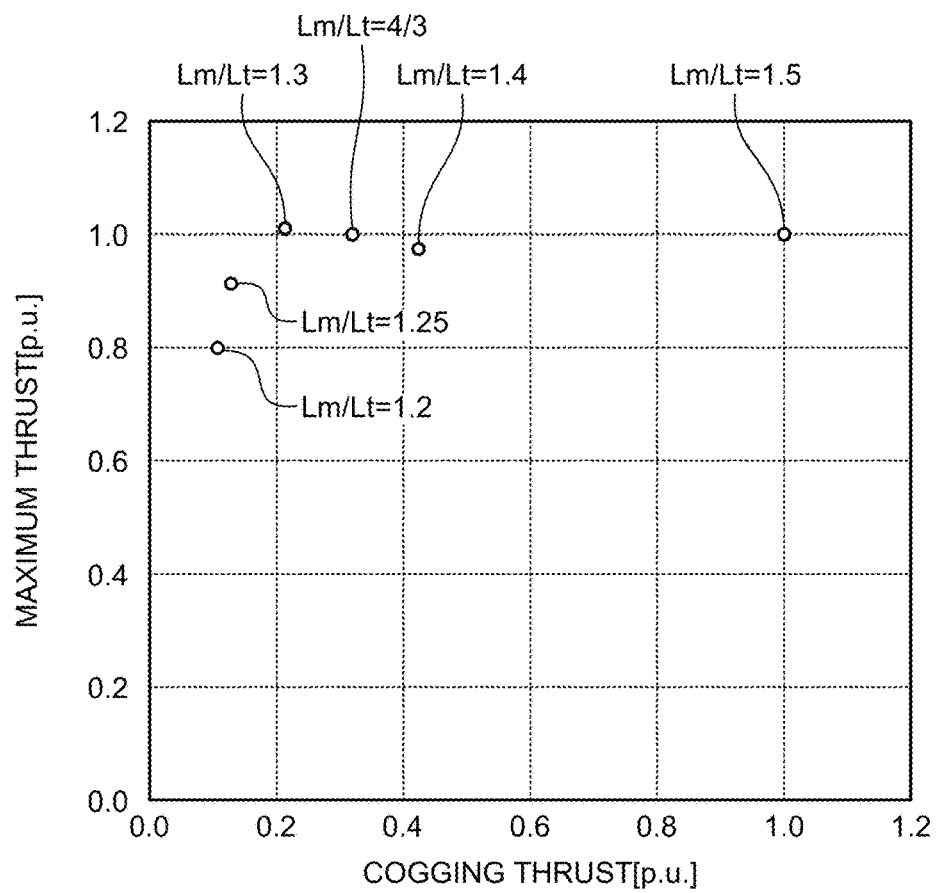
FIG. 3 is a view for explaining motor characteristics of the linear transport system according to the first embodiment.

FIG. 3 is a view for explaining motor characteristics of the linear transport system according to the first embodiment. A horizontal axis of a graph illustrated in FIG. 3 represents cogging thrust, and a vertical axis represents maximum thrust.

FIG. 3 illustrates a relationship between the cogging thrust and the maximum thrust when a motor size of the motor unit 50 is identical and the magnet pitch Lm and the tooth pitch Lt are changed. In FIG. 3, a relationship between the cogging thrust and the maximum thrust in each model of the motor unit 50 in which a value of Lm/Lt is variously changed is plotted.

In FIG. 3, a relationship between the cogging thrust and the maximum thrust is plotted for each of a model in which the value of Lm/Lt is "1.2", a model in which the value is "1.25", a model in which the value is "1.3", a model in which the value is "4/3", a model in which the value is "1.4", and a model in which the value is "1.5". Note that a current at the time of the maximum thrust of the motor unit 50 is adjusted in each model such that a copper loss generated in the coil 11 is equivalent.

For the model of Lm/Lt=1.3, the maximum thrust is largest among the models. In addition, the cogging thrust of the model of Lm/Lt=1.3 is slightly different from the cogging thrust of the model of Lm/Lt=1.2 with the smallest cogging thrust.

For the model of Lm/Lt=1.5, the maximum thrust is the second largest among the models, while the cogging thrust is the largest among the models.

For the model of Lm/Lt=1.2, the cogging thrust is smallest among the models, while the maximum thrust is also smallest among the models.

For the model of Lm/Lt=1.25, the cogging thrust is the second smallest among the models, while the maximum thrust is also the second smallest among the models.

For the model of Lm/Lt=4/3, the maximum thrust is equivalent to the model of Lm/Lt=1.5 and the second largest among the models. In addition, the cogging thrust of the model of Lm/Lt=4/3 is slightly different from the cogging thrust of the model with Lm/Lt=1.2 with the lowest cogging thrust.

For the model of Lm/Lt=1.4, the maximum thrust is close to that of the model of Lm/Lt=4/3. In addition, the cogging thrust of the model of Lm/Lt=1.4 is slightly different from the cogging thrust of the model of Lm/Lt=1.2 with the smallest cogging thrust.

In addition, in the model of Lm/Lt=1.3, the maximum thrust is the largest among the models, and the maximum thrust of the model of Lm/Lt=4/3 and Lm/Lt=1.4 is slightly different from the maximum thrust of the model of Lm/Lt=1.3.

In this way, the cogging thrust of the model of Lm/Lt=1.4 is close to the smallest cogging thrust among the models, and the maximum thrust is close to the largest maximum thrust among the models. In addition, the cogging thrust of the model of Lm/Lt=1.3 is close to the smallest cogging thrust among the models, and the maximum thrust is the largest maximum thrust among the models. In addition, the cogging thrust of the model of Lm/Lt=4/3 is close to the smallest cogging thrust among the models, and the maximum thrust is close to the largest maximum thrust among the models.

That is, for the model of Lm/Lt=4/3, it is possible to reduce or prevent an increase in cogging thrust while maintaining the maximum thrust of the model of Lm/Lt=1.3. Therefore, the linear transport system 100 of the first embodiment is configured such that 1.3≤Lm/Lt≤1.4 is satisfied. With such a configuration, the linear transport system 100 can achieve both reduction of cogging thrust generated by a magnetic force of attraction between the iron core 12 and the magnet 21 and improvement of thrust density of the motor unit 50. In addition, since it suffices that 1.33 Lm/Lt≤1.4 is satisfied, it is not necessary to increase the size of the motor unit 50.

The shapes and the magnetic characteristics are all identical among the magnets 21 included in the movable element 2 of the linear transport system 100. Therefore, the manufacturing cost of the linear transport system 100 can be reduced.

Further, since the motor drive control device 10 generates any current waveform, it is possible to select a combination of any number of magnets Nm and any number of teeth Nt within the range of 1.35 Lm/Lt≤1.4, and it is possible to further reduce cogging thrust and improve thrust density of the motor unit 50.

In this way, according to the first embodiment, when a magnet pitch which is the pitch of the magnets 21 disposed in the movable element 2 is Lm, and the tooth pitch which is the pitch of the teeth 13 is Lt, 1.3≤Lm/Lt≤1.4 is satisfied in the linear transport system 100, so that it is possible to improve thrust density while reducing cogging thrust. In addition, by causing 1.3≤Lm/Lt≤1.4 to be satisfied, thrust density of the motor unit 50 can be improved, so that it is possible to reduce or prevent an increase in size of the motor unit 50.

Second Embodiment

Next, a second embodiment will be described with reference to FIG. 4. In the second embodiment, the number of turns and a wire diameter of each of the coils 11 wound around the teeth 13 are identical among the teeth 13.

Figure 4:
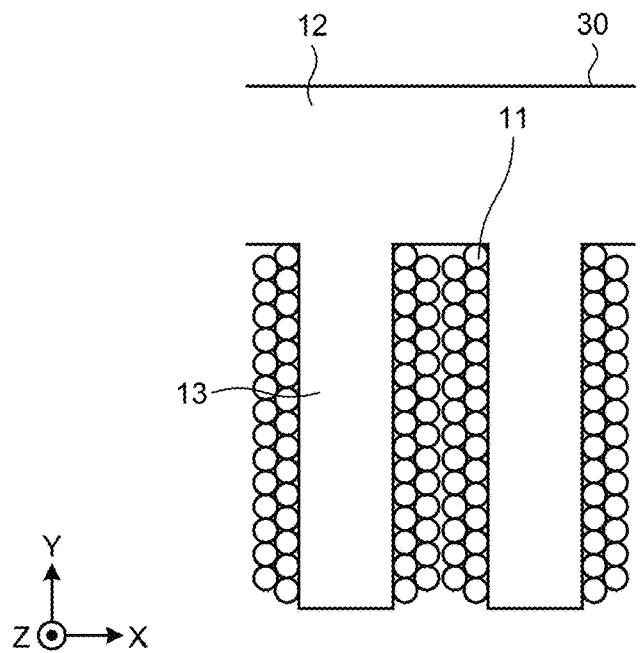
FIG. 4 is a transverse cross-sectional view of a stator module included in a linear transport system according to a second embodiment.

FIG. 4 is a transverse cross-sectional view of a stator module included in a linear transport system according to the second embodiment. Among the individual components in FIG. 4, components that achieve functions identical to those of the stator module group 1A of the first embodiment illustrated in FIG. 2 are denoted by the identical reference numerals, and redundant descriptions will be omitted. FIG. 4 illustrates a cross-sectional configuration of a part of the stator module 30 when the linear transport system 100 illustrated in FIG. 1 is cut along a plane parallel to the XY plane.

In the linear transport system 100 according to the second embodiment, the number of turns and a wire diameter of each of the coils 11 wound around the teeth 13 are identical among the teeth 13. By generating any current waveform that is not three-phase AC, that is, a current waveform of single-phase AC, and supplying the current waveform to each coil 11, the motor drive control device 10 can output any thrust even when the number of turns and the wire diameter of the coil 11 are identical, when Nt/k=3 n+1 or Nt/k=3 n+2 is satisfied.

As described above, according to the second embodiment, since the motor drive control device 10 generates any current waveform, it is possible to output any thrust even when the number of turns and the wire diameter are identical among the coils 11. In addition, since the number of turns and the wire diameter can be made identical among the coils 11 of the stator module group 1A, the motor unit 50 can be easily manufactured.

Third Embodiment

Next, a third embodiment will be described with reference to FIGS. 5 and 6. In the third embodiment, a magnet pitch of the magnets 21 disposed at an end portion of the movable element 2 is set longer than a magnet pitch of the magnets 21 disposed at a central portion of the movable element 2.

Figure 5:
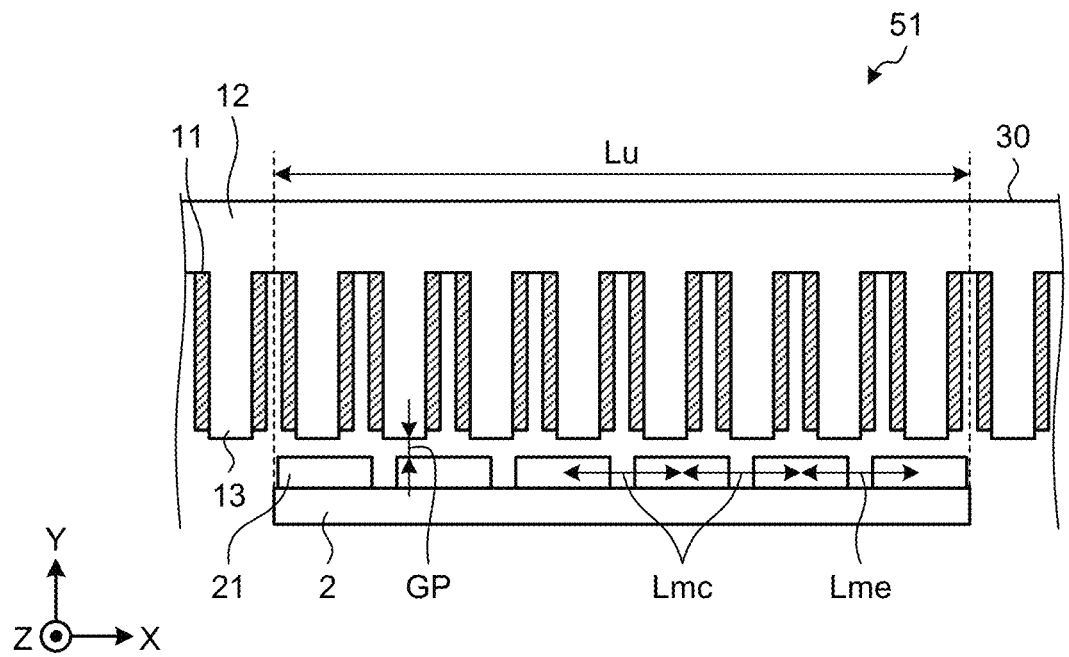
FIG. 5 is a transverse cross-sectional view of a straight portion of a motor unit included in a linear transport system according to a third embodiment.

FIG. 5 is a transverse cross-sectional view of a straight portion of a motor unit included in a linear transport system according to the third embodiment. FIG. 6 is a transverse cross-sectional view of a curved portion of a motor unit included in the linear transport system according to the third embodiment. Among the individual components in FIGS. 5 and 6, components that achieve functions identical to those of the motor unit 50 of the first embodiment illustrated in FIG. 2 are denoted by the identical reference numerals, and redundant descriptions will be omitted.

FIG. 5 illustrates a cross-sectional configuration of a part of the straight portion of the motor unit 51 (the straight portion of the transport path 5) included in the stator module group 1A when the linear transport system 100 illustrated in FIG. 1 is taken along a plane parallel to the XY plane. FIG. 6 illustrates a cross-sectional configuration of a part of a curved portion of the motor unit 51 included in the stator module group 1A when the linear transport system 100 illustrated in FIG. 1 is taken along a plane parallel to the XY plane.

The straight portion of the motor unit 51 illustrated in FIG. 5 includes the stator module 30 and the movable element 2. The curved portion of the motor unit 51 illustrated in FIG. 6 includes the stator module 40 and the movable element 2. Note that, in FIG. 6, illustration of the coil 11 is omitted.

Figure 6:
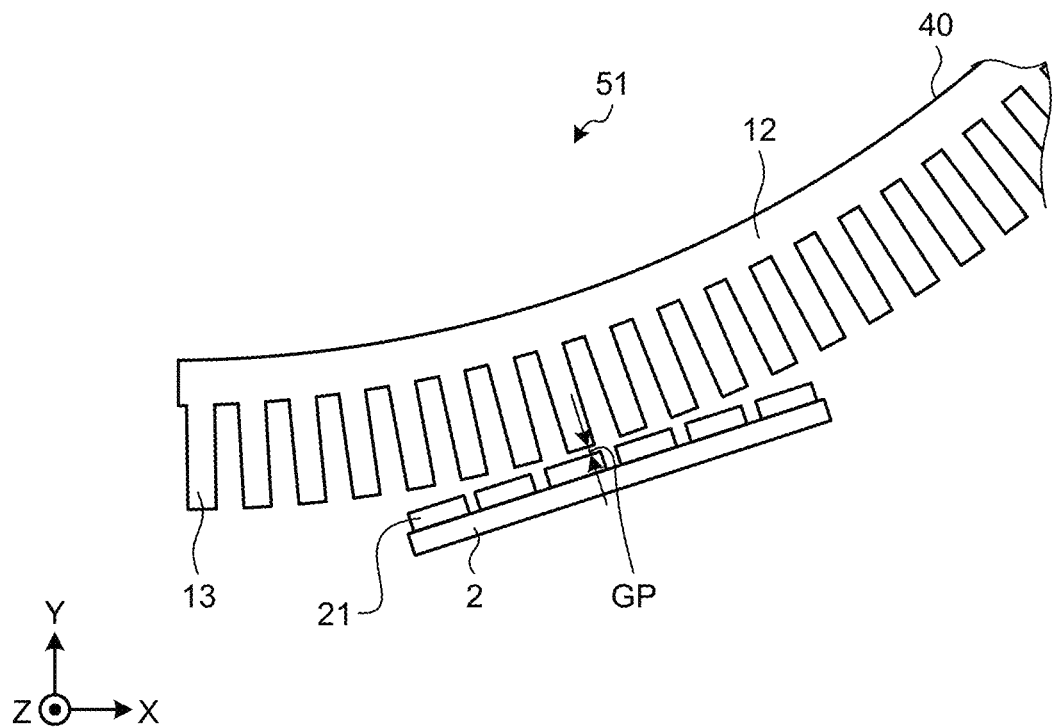
FIG. 6 is a transverse cross-sectional view of a curved portion of the motor unit included in the linear transport system according to the third embodiment.

FIGS. 5 and 6 illustrate a configuration where the movable element 2 includes six magnets 21. Note that the movable element 2 of the motor unit 51 may include two to five magnets 21 or seven or more magnets 21.

In the motor unit 51 according to the third embodiment, when a unit length is Lu and the number of magnets is Nm, a center magnet pitch Lmc, which is a magnet pitch of the magnets 21 in a magnet array excluding the magnets 21 at end portions in the moving direction of the movable element 2, satisfies Lmc>Lu/Nm. That is, in the motor unit 51, when the unit length is Lu and the number of magnets is Nm, the center magnet pitch Lmc of the magnet(s) 21 disposed at a central portion in the moving direction of the movable element 2 satisfies Lmc>Lu/Nm. Further, an end magnet pitch Lme, which is a magnet pitch of the magnets 21 disposed at end portions in the moving direction of the movable element 2, satisfies Lme>Lu/Nm.

Note that a magnet pitch of the magnets 21 disposed between the central portion and the end portion in the moving direction of the movable element 2 may satisfy Lmc>Lu/Nm or Lme>Lu/Nm. In the motor unit 51, the magnet pitch becomes larger as the magnet 21 is closer to both end portions in the moving direction of the movable element 2. The magnet pitches of the magnets 21 included in the movable element 2 are symmetrical with a center of a disposition direction of the magnets 21 as a symmetry axis.

A shortest distance between the magnet 21 included in the movable element 2 and the tooth 13 included in the stator module group 1A is a magnetic gap GP indicating a distance between the magnet 21 and the iron core 12. The magnetic gap GP indicating the distance between the magnet 21 and the iron core 12 is constant in the straight portion of the motor unit 51. That is, the magnetic gap GP is constant in the straight portion of the stator module group 1A in which the moving direction of the movable element 2 is a straight line. Whereas, since the iron core 12 is bent in the curved portion of the motor unit 51, the magnetic gap GP is not constant and varies depending on a position of the movable element 2.

That is, in the curved portion of the motor unit 51, the magnetic gap GP between the iron core 12 and the magnet 21 disposed at the central portion in the moving direction of the movable element 2 is smaller than the magnetic gap GP between the iron core 12 and the magnets 21 disposed at the end portions in the moving direction of the movable element 2.

As in the motor unit 51, by satisfying Lmc>Lu/Nm and Lme>Lu/Nm, the linear transport system 100 can reduce both cogging thrust generated in the straight portion and cogging thrust generated in the curved portion. That is, while the magnet 21 disposed at the central portion of the movable element 2 and the magnet 21 disposed at the end portion of the movable element 2 are magnets of one type (an identical shape and identical magnetic characteristics), the linear transport system 100 can reduce both of cogging thrust generated in the straight portion where the magnetic gap GP is constant and cogging thrust generated in the curved portion where the magnetic gap GP is not constant.

In this way, in the third embodiment, in the linear transport system 100, the center magnet pitch Lmc of the magnet 21 disposed at the central portion of the movable element 2 satisfies Lmc>Lu/Nm, and the end magnet pitch Lme disposed at the end portion of the movable element 2 satisfies Lme>Lu/Nm. As a result, even when the magnets 21 of one type are disposed, the linear transport system 100 can reduce both of cogging thrust generated in the straight portion where the magnetic gap GP is constant and cogging thrust generated in the curved portion where the magnetic gap GP is not constant.

Fourth Embodiment

Next, a fourth embodiment will be described with reference to FIG. 7. In the fourth embodiment, when the number of the magnets Nm is two or three, the magnet pitch is set so as to satisfy Lme>Lu/Nm.

Figure 7:
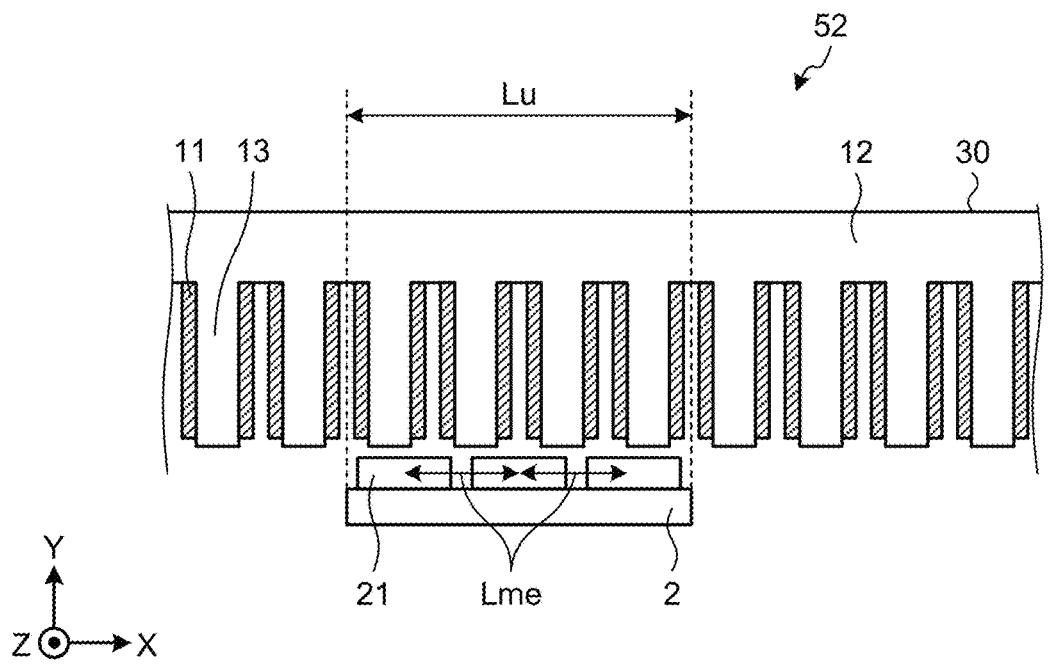
FIG. 7 is a transverse cross-sectional view of a straight portion of a motor unit included in a linear transport system according to a fourth embodiment.

FIG. 7 is a transverse cross-sectional view of a straight portion of a motor unit included in the linear transport system according to the fourth embodiment. Among the individual components in FIG. 7, components that achieve functions identical to those of the motor unit 50 of the first embodiment illustrated in FIG. 2 are denoted by the identical reference numerals, and redundant descriptions will be omitted. FIG. 7 illustrates a cross-sectional configuration of a part of the motor unit 52 included in the stator module group 1A when the linear transport system 100 illustrated in FIG. 1 is cut along a plane parallel to the XY plane. The motor unit 52 includes the stator module 30 and the movable element 2.

The movable element 2 of the motor unit 52 includes three magnets 21. Note that the movable element 2 of the motor unit 52 may include two magnets 21. When the number of magnets Nm is three or less, all magnet pitches Lm satisfy Lm=Lme. In this case, by causing Lme>Lmc to be satisfied, the motor unit 52 satisfies Lme>Lu/Nm. In other words, by setting the end magnet pitch Lme to be larger than a value obtained by dividing the unit length Lu by the number of magnets Nm, the motor unit 52 satisfies Lme>Lu/Nm also in the fourth embodiment, similarly to the third embodiment.

With the configuration of the motor unit 52, similarly to the motor unit 51, the linear transport system 100 can reduce both of cogging thrust generated in the straight portion and cogging thrust generated in the curved portion. That is, while the magnet 21 disposed at the central portion of the movable element 2 and the magnet 21 disposed at the end portions of the movable element 2 are magnets of one type, the linear transport system 100 can reduce both of cogging thrust generated in the straight portion where the magnetic gap is constant and cogging thrust generated in the curved portion where the magnetic gap is not constant.

As described above, according to the fourth embodiment, similarly to the third embodiment, even when the magnets 21 of one type are disposed, the linear transport system 100 can reduce both of cogging thrust generated in the straight portion where the magnetic gap is constant and cogging thrust generated in the curved portion where the magnetic gap is not constant.

Fifth Embodiment

Next, a fifth embodiment will be described with reference to FIGS. 8 and 9. In the fifth embodiment, the magnet 21 closer to an end portion of a movable element (movable elements 2A and 2B to be described later) has a smaller magnetic gap.

Figure 8:
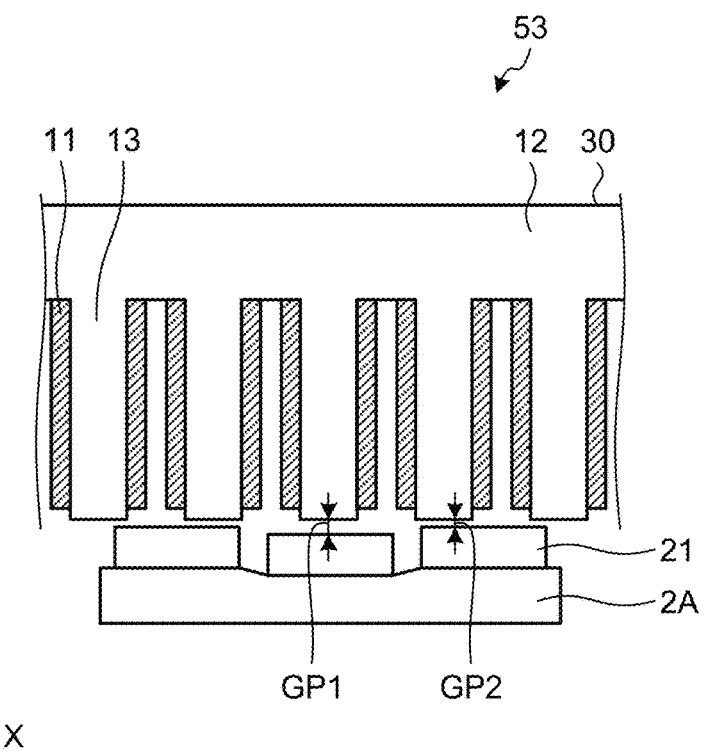
FIG. 8 is a transverse cross-sectional view of a motor unit of a first example included in a linear transport system according to a fifth embodiment.

FIG. 8 is a transverse cross-sectional view of a motor unit of a first example included in a linear transport system according to the fifth embodiment. FIG. 9 is a transverse cross-sectional view of a motor unit of a second example included in the linear transport system according to the fifth embodiment. Among the individual components in FIGS. 8 and 9, components that achieve functions similar to those of the motor unit 50 of the first embodiment illustrated in FIG. 2 are denoted by the same reference numerals, and redundant descriptions will be omitted.

FIG. 8 illustrates a cross-sectional configuration of a part of the motor unit 53 included in the stator module group 1A when the linear transport system 100 illustrated in FIG. 1 is taken along a plane parallel to the XY plane. FIG. 9 illustrates a cross-sectional configuration of a part of the motor unit 54 included in the stator module group 1A when the linear transport system 100 illustrated in FIG. 1 is taken along a plane parallel to the XY plane.

The motor unit 53 includes the stator module 30 and the movable element 2A. The motor unit 54 includes the stator module 30 and the movable element 2B.

As illustrated in FIG. 8, the motor unit 53 of the first example of the fifth embodiment includes the movable element 2A instead of the movable element 2. In the motor unit 53, a thickness of the movable element 2A in the Y-axis direction is thinner at a central portion in the moving direction of the movable element 2A than that at an end portion. Therefore, in the motor unit 53, in the straight portion where the moving direction of the movable element 2A is a straight line, a distance between the iron core 12 and the central portion in the moving direction of the movable element 2A is larger than a distance between the iron core 12 and the end portion in the moving direction of the movable element 2A. Further, in the motor unit 53, all the magnets 21 disposed in the movable element 2A have an identical thickness in the Y-axis direction.

Therefore, in the straight portion of the motor unit 53, a magnetic gap GP1 between the iron core 12 and the magnet 21, which has the magnets 21 disposed at both ends thereof in the moving direction of the movable element 2A, is larger than a magnetic gap GP2 between the iron core 12 and the magnet 21, which is disposed at the end portion of the movable element 2A. That is, in the straight portion of the motor unit 53, the magnetic gap GP1 between the iron core 12 and the magnet 21 disposed at the central portion of the movable element 2A is larger than the magnetic gap GP2 between the iron core 12 and the magnet 21 disposed at the end portion of the movable element 2A. In the motor unit 53, the magnetic gap GP1 is a first magnetic gap, and the magnetic gap GP2 is a second magnetic gap.

Figure 9:
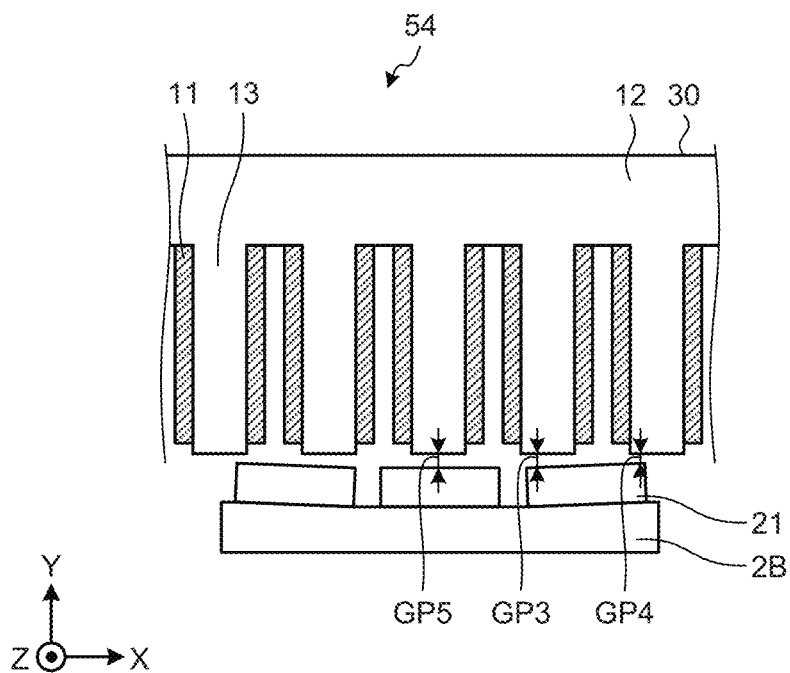
FIG. 9 is a transverse cross-sectional view of a motor unit of a second example included in the linear transport system according to the fifth embodiment.

As illustrated in FIG. 9, the motor unit 54 of the second example of the fifth embodiment includes the movable element 2B instead of the movable element 2. In the motor unit 54, a thickness of the movable element 2B in the Y-axis direction continuously decreases from an end portion to a central portion in a moving direction of the movable element 2B. In other words, in the motor unit 54, a distance between the movable element 2B and the iron core 12 continuously increases from the end portion to the central portion in the moving direction of the movable element 2B. Further, in the motor unit 54, all the magnets 21 disposed in the movable element 2B have an identical thickness in the Y-axis direction.

Therefore, in the straight portion of the motor unit 54, the magnet 21 closer to the central portion of the movable element 2B has a larger average value of the magnetic gap between the magnet 21 and the iron core 12. That is, in the motor unit 54, an average value of a magnetic gap GP5 between the iron core 12 and the magnet 21 disposed in the central portion of the movable element 2B is the largest. In FIG. 9, since the movable element 2B includes three magnets 21, one magnet 21 is disposed at the central portion of the movable element 2B. However, when the movable element 2B includes magnets 21 whose number of pieces is an even number, two magnets 21 are disposed at the central portion of the movable element 2B. In this case, an average value of magnetic gaps of the two magnets 21 is an average value of the magnetic gap in the central portion of the movable element 2B.

Further, in the motor unit 54, the magnet 21 that is not disposed at the central portion in the moving direction of the movable element 2B has a smaller magnetic gap as the magnet 21 is closer to the end portion of the movable element 2B. In addition, the average value of the magnetic gap is smaller toward the end portion side in one magnet 21.

FIG. 9 illustrates a state in which a magnetic gap GP4 on a right end side of the movable element 2B is smaller than a magnetic gap GP3 on a center side (a left end side) of the movable element 2B in the magnet 21 disposed at the end portion of the movable element 2B. An average value of the magnetic gap of the magnet 21 disposed at the end portion of the movable element 2B is calculated from the magnetic gaps GP3, GP4, and the like.

Note that, among side surfaces of the movable element 2B, a surface on which the magnet 21 is disposed may be a curved surface, a surface in which a plurality of planes are connected, or a surface in which a curved surface and a plane are combined.

In this way, in the motor unit 54, the magnetic gap between the iron core 12 and the magnet 21 at the end portion of the movable element 2B is not constant but continuously changes, and the magnetic gap becomes smaller as being closer to the end portion. Therefore, in the motor unit 54, the average value of the magnetic gap of the magnet 21 at the end portion is smaller than the magnetic gap of the magnet 21 at the central portion. In the motor unit 54, the magnetic gap GP5 is a first magnetic gap, and a magnetic gap calculated from the magnetic gaps GP3 and GP4 is a second magnetic gap.

With the configuration of the motor units 53 or 54, similarly to the motor units 51 and 52, the linear transport system 100 can reduce both of cogging thrust generated in the straight portion and cogging thrust generated in the curved portion. That is, while magnets of the same type are used for the magnet 21 disposed at the central portion and the magnet 21 disposed at the end portion of the movable element 2A or the movable element 2B, the linear transport system 100 can reduce both of cogging thrust generated in the straight portion where the magnetic gap is constant and cogging thrust generated in the curved portion where the magnetic gap is not constant.

As described above, according to the fifth embodiment, similarly to the second to fourth embodiments, even when the same type of magnets 21 are disposed, the linear transport system 100 can reduce both of cogging thrust generated in the straight portion where the magnetic gap is constant and cogging thrust generated in the curved portion where the magnetic gap is not constant.

Sixth Embodiment

Next, a sixth embodiment will be described with reference to FIG. 10. In the sixth embodiment, a gap is provided between the iron cores 12 between stator modules.

Figure 10:
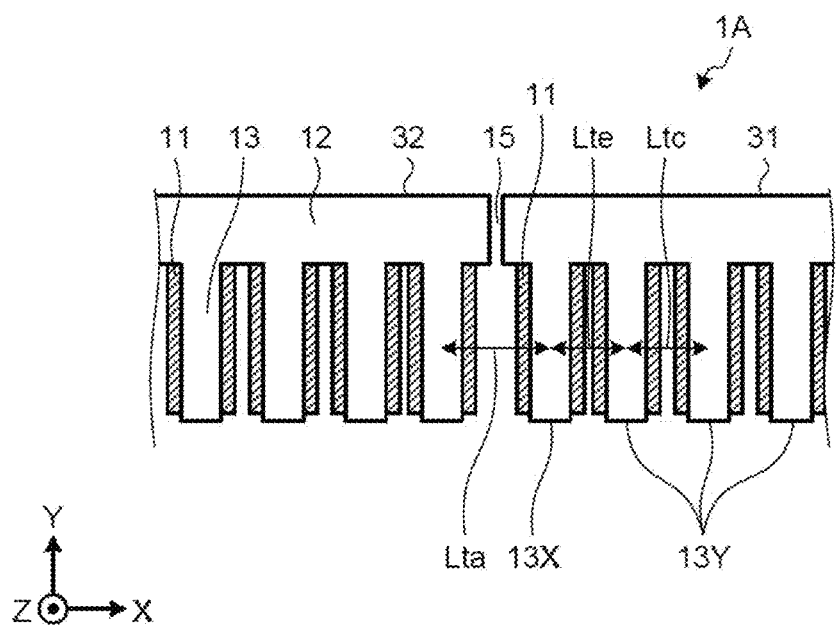
FIG. 10 is a transverse cross-sectional view of a stator module included in a linear transport system according to a sixth embodiment.

FIG. 10 is a transverse cross-sectional view of a stator module included in a linear transport system according to the sixth embodiment. Among the individual components in FIG. 10, components that achieve functions identical to those of the motor unit 50 of the first embodiment illustrated in FIG. 2 are denoted by the identical reference numerals, and redundant descriptions will be omitted. FIG. 10 illustrates a cross-sectional configuration of a part of the stator module group 1A when the linear transport system 100 illustrated in FIG. 1 is cut along a plane parallel to the XY plane.

The stator module group 1A includes a stator module 31 and a stator module 32. The stator module 31 and the stator module 32 are adjacent to each other. In the linear transport system 100 according to the sixth embodiment, a gap 15 is provided between the iron cores 12 between the stator module 31 and the stator module 32.

Among the teeth 13 of the stator module 31, the tooth 13 disposed at an end portion in a moving direction (here, the X-axis direction) of the movable element 2 is an end tooth 13X. The teeth 13 of the stator module 31 other than the end tooth 13X are central teeth 13Y. In the stator module 31, a shape of the end tooth 13X and a shape of the central tooth 13Y are identical. As a result, a shape of an insulator to be used for insulation between the end tooth 13X and the coil 11 can be made identical to a shape of an insulator to be used for insulation between the central tooth 13Y and the coil 11.

Among the pitches between the teeth 13 of the stator module 31, a pitch (a pitch between the teeth 13 on a side where the gap 15 is provided) between the teeth 13 disposed at the end portion in the moving direction (here, the X-axis direction) of the movable element 2 is an end tooth pitch Lte. Among the pitches between the teeth 13 of the stator module 31, a pitch between the teeth 13 each of which has the teeth 13 disposed at both ends thereof in the moving direction of the movable element 2 is a central tooth pitch Ltc. That is, among the pitches between the teeth 13 of the stator module 31, a pitch between the teeth 13 disposed at the central portion in the moving direction of the movable element 2 is the central tooth pitch Ltc. In the stator module 31, the teeth 13 are disposed so as to satisfy Ltc>Lte. Similarly, in the stator module group 1A, the teeth 13 are disposed such that all the stator modules (the stator module 32 and the like) included in the stator module group 1A satisfy Ltc>Lte.

Note that the pitch between the teeth 13 disposed at the end portion on the side where the gap 15 is not provided is identical to that of the central tooth pitch Ltc. For example, in the stator module group 1C illustrated in FIG. 1, the tooth 13 at a farthest end in a positive X-axis direction and the tooth 13 at a farthest end in a negative X-axis direction are the teeth 13 disposed on the sides where the gap 15 is not provided. The pitch between the tooth 13 disposed at the end portion on the side where the gap 15 is not provided and the tooth 13 adjacent to this tooth 13 is identical to that of the central tooth pitch Ltc.

The coil 11 is also wound around the end tooth 13X similarly to the central tooth 13Y, and the number of turns of the coil 11 of the end tooth 13X is equal to the number of turns of the coil 11 of the central tooth 13Y.

In the linear transport system 100, since the gap 15 is provided between the stator module 31 and the stator module 32, assemblability of the stator module group 1A is improved. When the gap 15 is provided between the stator module 31 and the stator module 32 as in the sixth embodiment, cogging thrust increases due to magnetic imbalance caused by an influence of the gap 15. However, in the sixth embodiment, since the teeth 13 are disposed so as to satisfy Ltc>Lte, the cogging thrust caused by the gap 15 can be reduced.

As described above, according to the sixth embodiment, in the linear transport system 100, since the gap 15 is provided between the iron cores 12 between the stator modules 31 and 32, the stator module group 1A can be easily assembled. Further, in the linear transport system 100, since the teeth 13 are disposed so as to satisfy Ltc>Lte, the cogging thrust caused by the gap 15 can be reduced.

The configurations illustrated in the above embodiments illustrate one example and can be combined with another known technique, and it is also possible to combine embodiments with each other and omit and change a part of the configuration without departing from the subject matter of the present disclosure.

REFERENCE SIGNS LIST 1A to 1C stator module group; 2, 2A, 2B movable element; 5 transport path; 10 motor drive control device; 11 coil; 12 iron core; 13 tooth; 13X end tooth; 13Y central tooth; 15 gap; 21 magnet; 30 to 32, 40 stator module; 50 to 54 motor unit; 100 linear transport system.

The invention claimed is:

1. A linear transport system comprising:
   a stator module including an iron core and a coil wound around the iron core, the iron core including a plurality of teeth;
   a movable element to be propelled by an electromagnetic force from the coil, the movable element including a plurality of magnets that are identical and disposed on a side surface parallel to a moving direction; and
   a motor drive controller to control the movable element by supplying an independent current of single-phase alternating current individually to the coil included in the stator module, wherein
   when Lm is a magnet pitch that is a pitch of the magnets disposed in the movable element, and Lt is a tooth pitch that is a pitch of the teeth, $1.3 \leq Lm/Lt \leq 1.4$ is satisfied,
   a length of one piece of the movable element in a moving direction is shorter than a length of the stator module, and
   when Lu is a length of one piece of the movable element facing the stator module, Nm is a number of the magnets included in the length of the Lu, and Lme is an end magnet pitch that is a pitch of the magnets disposed at an end portion in a moving direction of the movable element, the Lme satisfies $Lme > Lu/Nm$.

2. The linear transport system according to claim 1, wherein:
when Nm is a number of magnets included in a range in which one piece of the movable element faces the stator module face, Nt is a number of the teeth, k is a greatest common divisor between the Nm and the Nt, and n is a natural number, Nt/k=3n+1 or Nt/k=3n+2 is satisfied.

3. The linear transport system according to claim 1, wherein:
a number of turns and a wire diameter of the coil are each identical among the teeth.

4. The linear transport system according to claim 1, wherein:
when Lmc is a center magnet pitch that is a pitch of the magnets in a magnet array excluding a magnet at an end portion in a moving direction of the movable element, the Lmc satisfies Lmc>Lu/Nm,
magnets closer to both end portions in a moving direction of the movable element have a larger magnet pitch, and magnet pitches of magnets included in the movable element are symmetric with a center in a disposition direction of the magnets as a symmetry axis.

5. The linear transport system according to claim 1, wherein;
in a straight portion of the stator module in which a moving direction of the movable element is a straight line, an average value of a first magnetic gap is larger than an average value of a second magnetic gap, the first magnetic gap being a distance between each of the teeth and a corresponding one of the magnets that has magnets disposed at both ends thereof in a moving direction of the movable element, the second magnetic gap being a distance between each of the teeth and corresponding one of the magnets at an end portion in a moving direction of the movable element.

6. The linear transport system according to claim 1, wherein:
a gap is provided between the iron cores between the stator modules, and Ltc>Lte is satisfied when Ltc is a central tooth pitch that is a pitch between the teeth that has teeth disposed at both ends thereof in a moving direction of the movable element, and Lte is an end tooth pitch that is a pitch between the teeth disposed at an end portion in a moving direction of the movable element.

7. The linear transport system according to claim 6, wherein:
when Lta is a pitch between one tooth disposed at an end portion in the moving direction and another tooth disposed at an end portion in the moving direction, the teeth facing each other with the gap interposed therebetween, Lta>Ltc is satisfied.

* * * * *